(12) United States Patent
Araki

(10) Patent No.: US 10,389,703 B2
(45) Date of Patent: Aug. 20, 2019

(54) COMMUNICATION APPARATUS AND COMMUNICATION METHOD

(71) Applicant: CANON KABUSHIKI KAISHA, Tokyo (JP)

(72) Inventor: Yuichiro Araki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 215 days.

(21) Appl. No.: 15/493,834

(22) Filed: Apr. 21, 2017

(65) Prior Publication Data

US 2017/0339132 A1 Nov. 23, 2017

(30) Foreign Application Priority Data

May 23, 2016 (JP) ................................ 2016-102852

(51) Int. Cl.
| | | |
|---|---|---|
| *H04L 29/00* | (2006.01) | |
| *H04L 29/06* | (2006.01) | |
| *H04W 72/04* | (2009.01) | |
| *H04W 12/04* | (2009.01) | |
| *H04W 12/02* | (2009.01) | |
| *H04W 76/14* | (2018.01) | |
| *H04W 84/12* | (2009.01) | |

(52) U.S. Cl.
CPC ......... *H04L 63/0823* (2013.01); *H04W 12/02* (2013.01); *H04W 12/04* (2013.01); *H04W 72/0453* (2013.01); *H04W 76/14* (2018.02); *H04W 84/12* (2013.01)

(58) Field of Classification Search
CPC ..... H04W 8/005; H04W 76/14; H04W 48/16; H04W 4/80; H04W 88/06
See application file for complete search history.

(56) References Cited

U.S. PATENT DOCUMENTS

| | | | | |
|---|---|---|---|---|
| 8,630,635 B2* | 1/2014 | Tysowski | ............ | H04M 1/7253 380/247 |
| 2013/0065627 A1* | 3/2013 | Jung | ..................... | H04W 76/15 455/515 |
| 2013/0227275 A1* | 8/2013 | Satoh | ................... | H04L 9/3268 713/156 |

FOREIGN PATENT DOCUMENTS

JP 0003928589 6/2007

* cited by examiner

*Primary Examiner* — Ghazal B Shehni
(74) *Attorney, Agent, or Firm* — Venable LLP

(57) ABSTRACT

A communication apparatus capable of secure wireless communication by using a certificate, comprises: a determining unit that determines, in the communication apparatus, one of whether a first mode which operates as a role in deciding a communication channel used for direct wireless connection with a communication target apparatus is activated and whether a second mode which executes role decision processing of deciding whether to operate as the role in deciding the communication channel used for the direct wireless connection with the communication target apparatus is activated; and a control unit that executes certificate generation processing before being connected to the communication target apparatus if the determining unit determines that the first mode is activated and obtain the certificate held in the communication apparatus before executing the role decision processing if the determining unit determines that the second mode is activated.

10 Claims, 11 Drawing Sheets

F I G. 4A
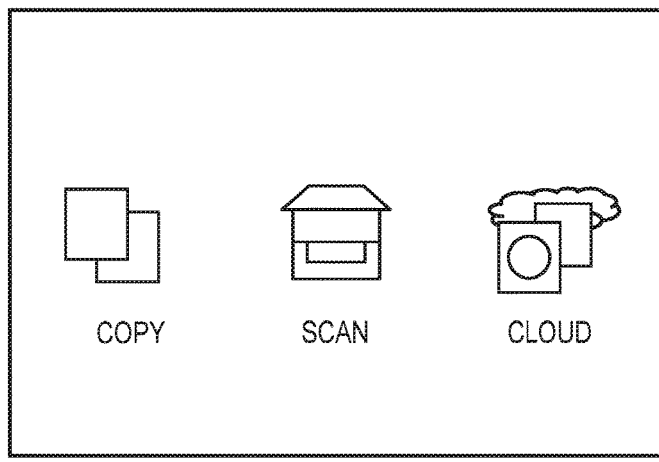
F I G. 4B
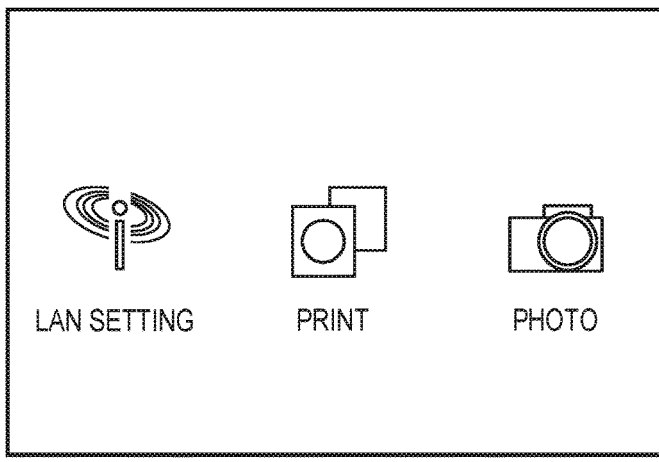
F I G. 4C
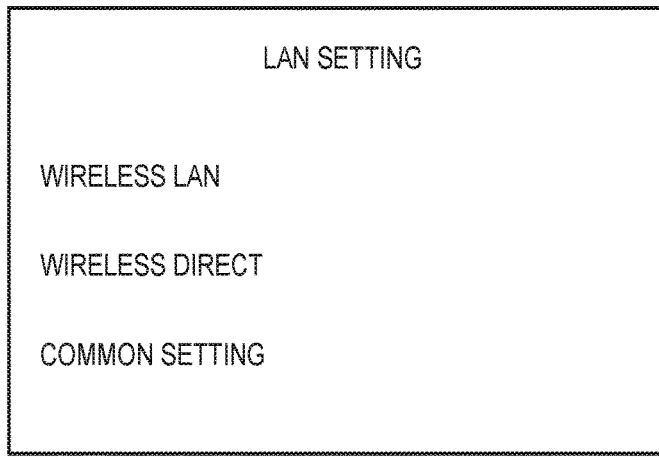

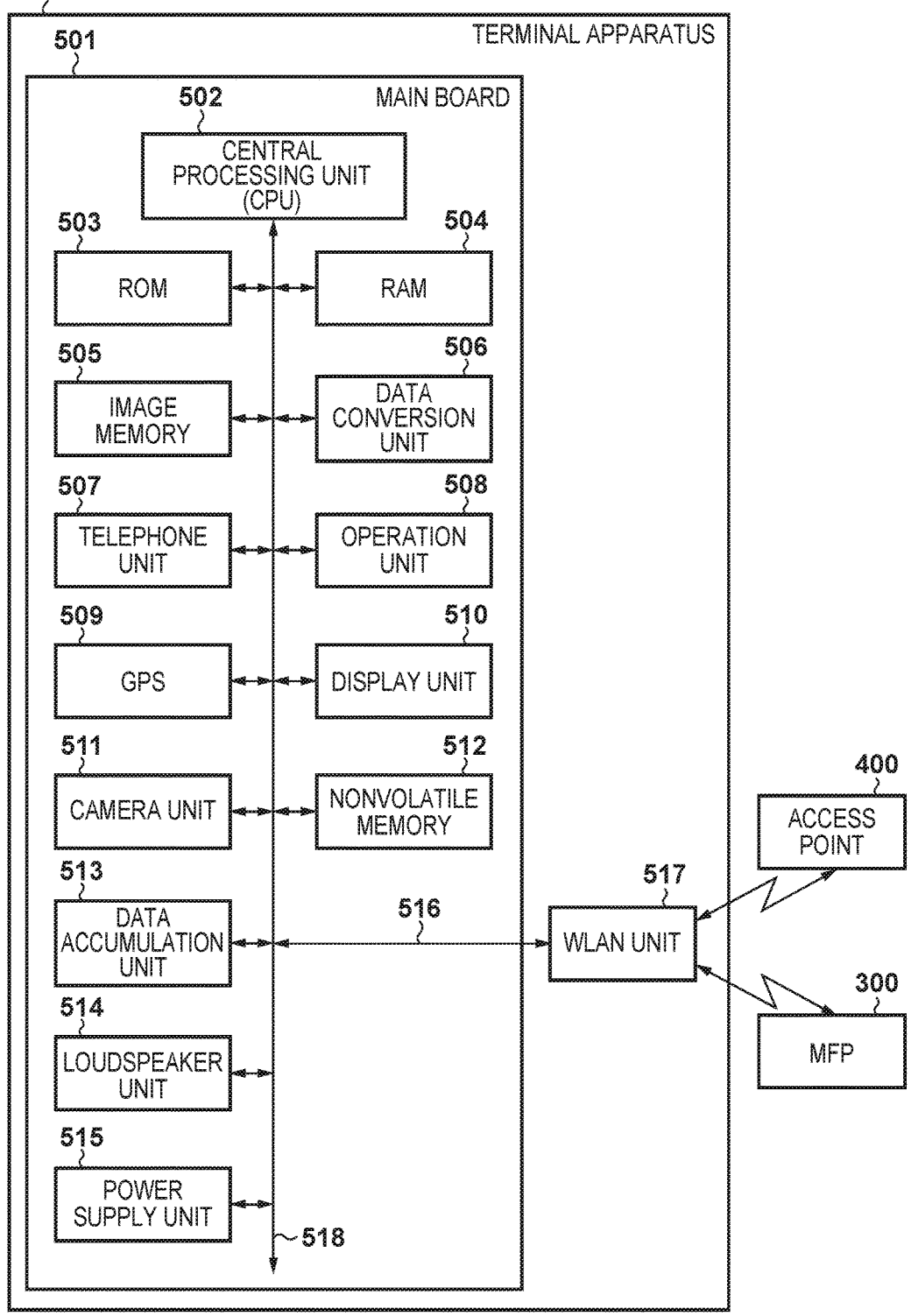

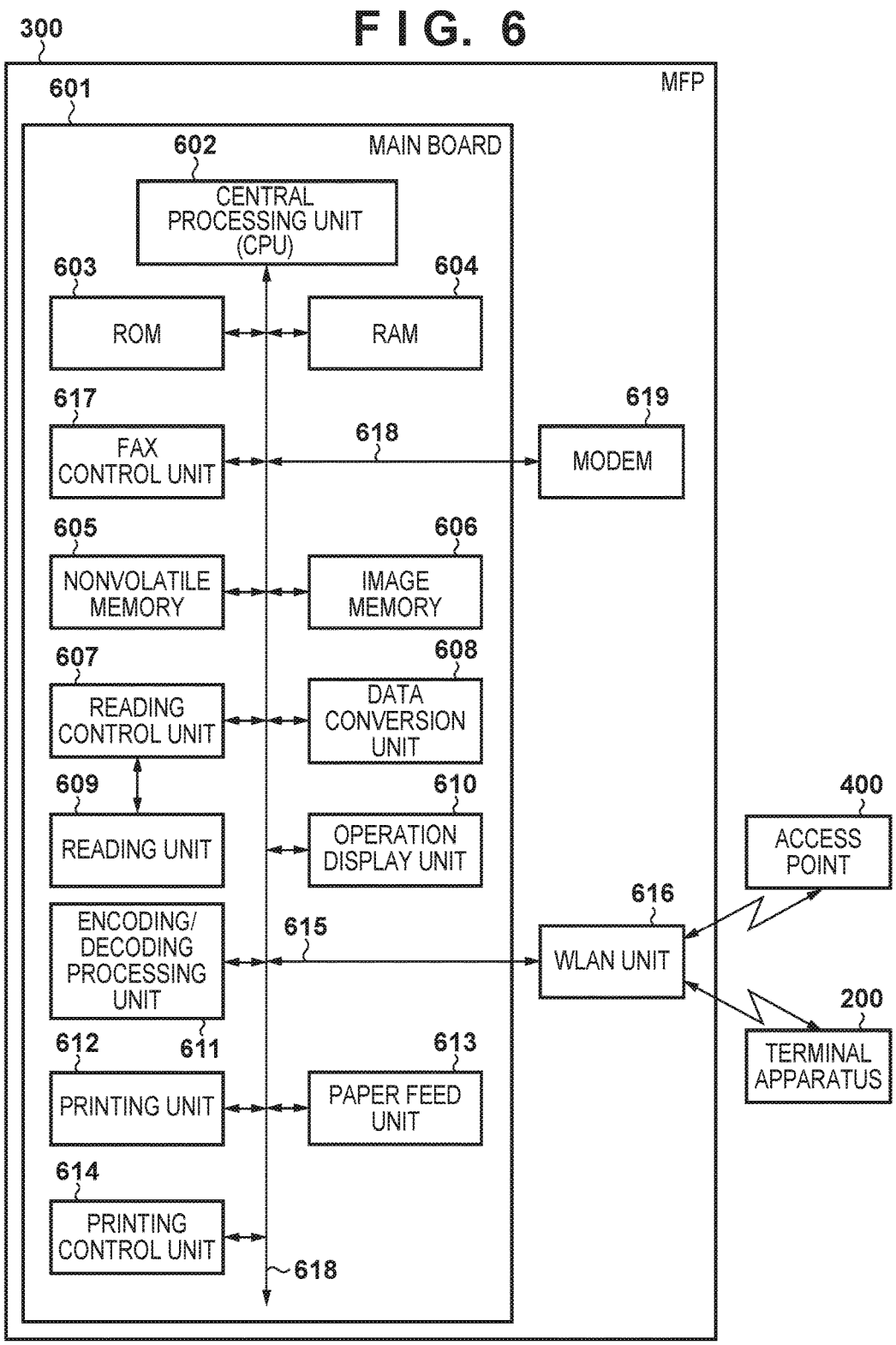

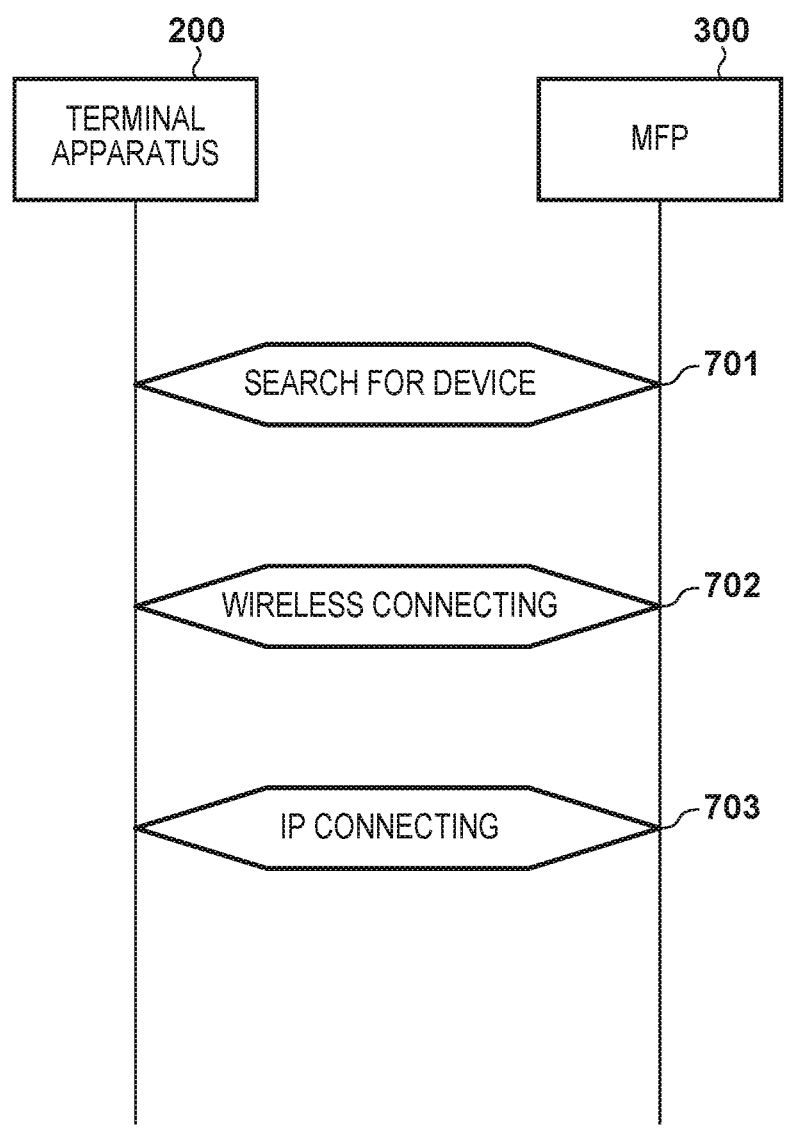

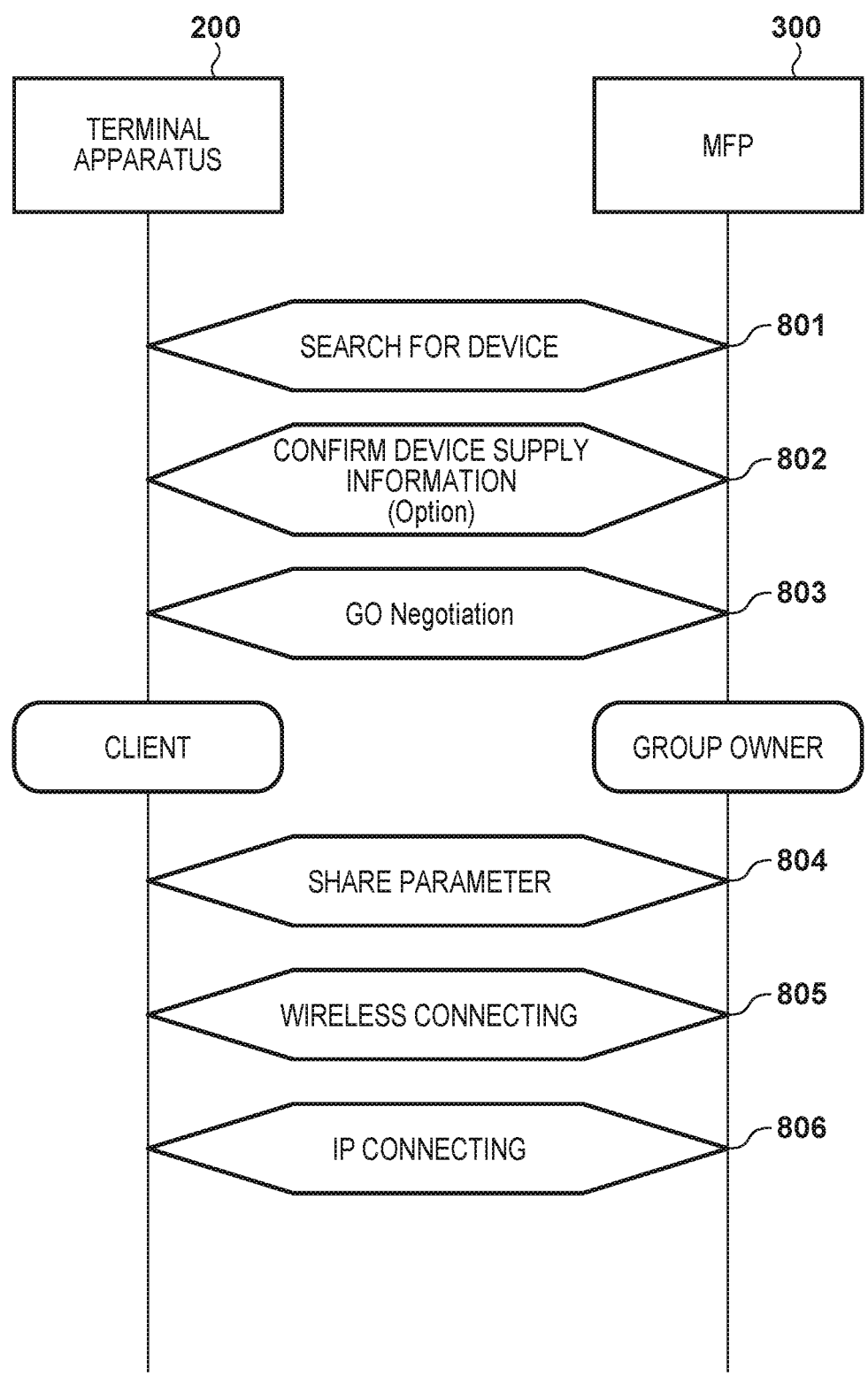

COMMUNICATION APPARATUS AND COMMUNICATION METHOD

BACKGROUND OF THE INVENTION

Field of the Invention

The present invention relates to a communication apparatus and a communication method.

Description of the Related Art

In recent years, SSL (Secure Sockets Layer) communication using a certificate is finding increasing use as a secure encrypted communication method in a network environment. In an apparatus such as an MFP (Multi-Function Printer) as well, an opportunity to use SSL in communication such as remote UI access or secure print for checking or setting an apparatus status is also increasing. Japanese Patent No. 3928589 has disclosed a method of generating a certificate in an apparatus.

A plurality of connection methods are known in a wireless communication system. More specifically, there is a method (for example, an infrastructure mode) of performing wireless connection with a target apparatus via an access point. There is also a method (Peer-to-Peer (P2P) mode) of performing wireless connection with the target apparatus directly by operating a self apparatus or the target apparatus as the access point. For example, Wi-Fi Direct® is known as a standard for implementing a P2P wireless connection method.

An apparatus described in Japanese Patent No. 3928589 is controlled so as to generate a server certificate when connection using encryption is requested from a client. However, certificate generation involves encryption processing, resulting in a high calculation processing load. Therefore, it may take much time for a response if the certificate is generated when the connection using the encryption is requested from the client. As a result, for example, a user has to wait for communication processing until the completion of certificate generation even though the user has already found a communication target apparatus of Wi-Fi-Direct® by using its terminal apparatus. Consequently, user operability may be degraded.

SUMMARY OF THE INVENTION

According to one aspect of the present invention, there is provided a communication apparatus capable of secure wireless communication with a communication target apparatus by using a certificate, the communication apparatus comprising: a determining unit configured to determine, in the communication apparatus, one of whether a first mode which operates as a role in deciding a communication channel used for direct wireless connection with the communication target apparatus is activated and whether a second mode which executes role decision processing of deciding whether to operate as the role in deciding the communication channel used for the direct wireless connection with the communication target apparatus is activated; and a control unit configured to execute certificate generation processing before being connected to the communication target apparatus if the determining unit determines that the first mode is activated and obtain the certificate held in the communication apparatus before executing the role decision processing if the determining unit determines that the second mode is activated.

According to another aspect of the present invention, there is provided a communication apparatus capable of secure wireless communication with a communication target apparatus by using a certificate, the apparatus comprising: a determining unit configured to determine, in the communication apparatus, one of whether a first mode which operates as a role in deciding a communication channel used for direct wireless connection with the communication target apparatus is activated and whether a second mode which executes role decision processing of deciding whether to operate as the role in deciding the communication channel used for the direct wireless connection with the communication target apparatus is activated; and a control unit configured to utilize a certificate generated by using a first encryption method if the determining unit determines that the first mode is activated and utilize a certificate generated by using a second encryption method lower in a load of certificate generation processing than the first encryption method if the determining unit determines that the second mode is activated.

According to one aspect of the present invention, there is provided a communication method in a communication apparatus capable of secure wireless communication with a communication target apparatus by using a certificate, the method comprising: in the communication apparatus, determining one of whether a first mode which operates as a role in deciding a communication channel used for direct wireless connection with the communication target apparatus is activated and whether a second mode which executes role decision processing of deciding whether to operate as the role in deciding the communication channel used for the direct wireless connection with the communication target apparatus is activated; executing certificate generation processing before being connected to the communication target apparatus if determining that the first mode is activated; and obtaining the certificate held in the communication apparatus before executing the role decision processing if determining that the second mode is activated.

According to one aspect of the present invention, there is provided a communication method in a communication apparatus capable of secure wireless communication with a communication target apparatus by using a certificate, the method comprising: in the communication apparatus, determining one of whether a first mode which operates as a role in deciding a communication channel used for direct wireless connection with the communication target apparatus is activated and whether a second mode which executes role decision processing of deciding whether to operate as the role in deciding the communication channel used for the direct wireless connection with the communication target apparatus is activated; and controlling to utilize a certificate generated by using a first encryption method if determining that the first mode is activated in the determining and utilize a certificate generated by using a second encryption method lower in a load of certificate generation processing than the first encryption method if determining that the second mode is activated.

According to the present invention, secure communication can be executed without degrading user operability.

Further features of the present invention will become apparent from the following description of exemplary embodiments (with reference to the attached drawings).

BRIEF DESCRIPTION OF THE DRAWINGS

FIGS. 4A, 4B, and 4C are views each showing an example of a screen displayed in an operation unit of the MFP;

FIG. 5 is a block diagram showing an example of the hardware arrangement of the terminal apparatus;

FIG. 6 is a block diagram showing an example of the hardware arrangement of the MFP;

FIG. 7 is a sequence chart showing a wireless connection sequence in an Autonomous GO mode;

FIG. 8 is a sequence chart showing a wireless connection sequence in a GO Negotiation mode;

DESCRIPTION OF THE EMBODIMENTS

Embodiments of the present invention will exemplarily be described in detail below with reference to the accompanying drawings. Note that the relative arrangement of components, display screens, and the like set forth in the embodiments do not intend to limit the scope of the invention to them, unless otherwise specified.

[System Arrangement]

First, an example of a system arrangement for implementing embodiments to be described below will be described with reference to FIGS. 1 to 6.

Figure 1:
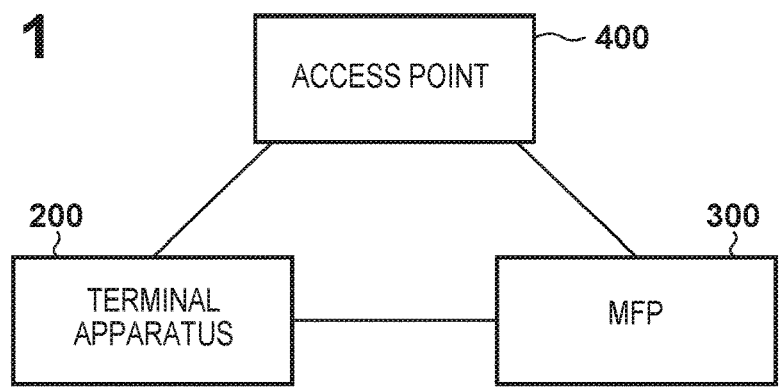
FIG. 1 is a block diagram showing an example of the arrangement of a wireless communication system.

FIG. 1 is a block diagram showing an example of the arrangement of a system including a portable communication terminal apparatus (to be simply referred to as a terminal apparatus) 200, a print apparatus (Multi Function Printer (to be referred to as an MFP hereinafter) 300, and an access point 400. FIG. 1 shows three apparatuses. However, the present invention is not limited to this, and FIG. 1 may include another apparatus. Further, each apparatus is not limited to one but may include a plurality of apparatuses. Furthermore, in this embodiment, a description will be given by taking, as an example, the print apparatus (MFP) as an apparatus capable of operating a plurality of wireless communication functions simultaneously. However, the present invention is not limited to this but may be applied to another communication apparatus.

The terminal apparatus 200 is an apparatus which includes a communication unit compatible with a wireless LAN (to be referred to as a WLAN hereinafter). For example, a personal information terminal such as a PDA (Personal Digital Assistant), a mobile phone, a digital camera, or the like can be given as the terminal apparatus 200. The print apparatus (MFP) 300 can only perform wireless communication with the terminal apparatus 200, and may additionally have a reading function (scanner), a FAX function, and a telephone function. In this embodiment, the print apparatus has been described by taking, as the example, the MFP having the reading function and a print function. However, the present invention is not limited to this, but the MFP may further have another function. The access point 400 includes a WLAN communication unit and provides communication in an infrastructure mode by relaying communication between apparatuses permitted to be connected to the access point 400.

The terminal apparatus 200 and the MFP 300 can perform wireless communication in the infrastructure mode via the access point 400 by their WLAN communication units, and can also perform communication in a P2P mode such as WFD. Note that the terminal apparatus 200 and the MFP 300 can execute processing compatible with a plurality of print services via the WLAN, as will be described later.

Figure 2:
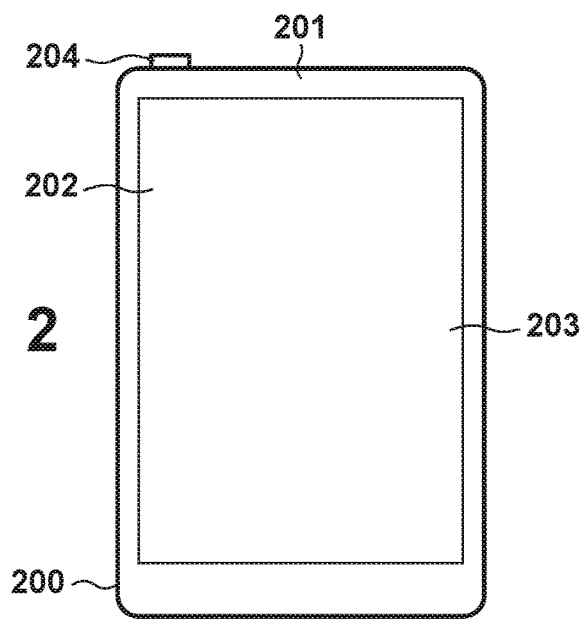
FIG. 2 is a view showing the outer appearance of a terminal apparatus according to an embodiment.

FIG. 2 is a view showing the outer appearance of the terminal apparatus 200 according to this embodiment. In this embodiment, a description will be given by taking, as an example, a smartphone as the terminal apparatus 200. The smartphone refers to a multi-function mobile phone which incorporates a camera, a web browser, an email function, and the like in addition to functions of a phone.

A WLAN unit 201 is a unit configured to perform WLAN communication. The WLAN unit 201 can perform, for example, data (packet) communication in a WLAN system complying with the IEEE802.11 series. In wireless communication using the WLAN unit 201, communication based on WFD, communication by a software AP (Access Point) mode or the infrastructure mode, or the like is available. A display unit 202 is, for example, a display having an LCD display mechanism. An operation unit 203 includes a touch-panel operation mechanism, and detects an operation by the user. A representative operation method includes a method of detecting an operation event by causing the display unit 202 to display a button icon and software keyboard, and causing the user to touch these portions. In this embodiment, the display unit 202 and the operation unit 203 have a touch-panel integrated arrangement. A power key 204 is a hard key used to power on/off the terminal apparatus 200.

Figure 3:
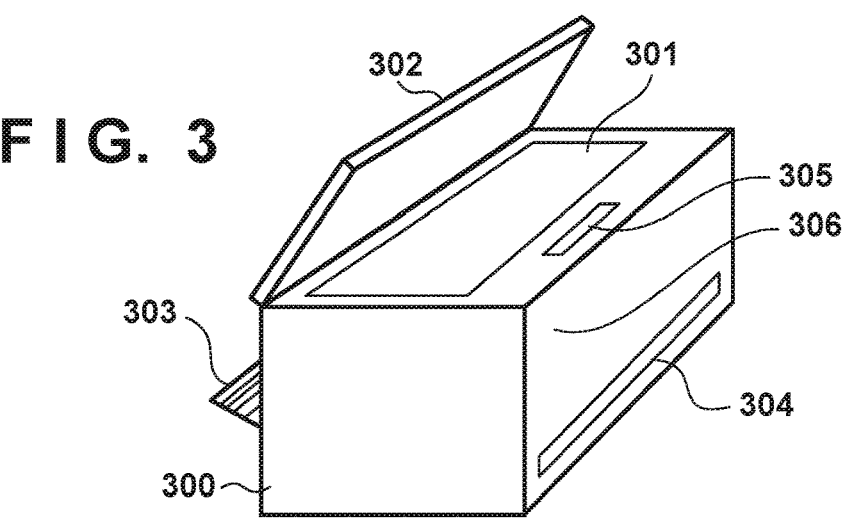
FIG. 3 is a view showing the outer appearance of an MFP according to an embodiment.

FIG. 3 is a view showing the outer appearance of the MFP 300 according to this embodiment. In FIG. 3, an original table 301 is a transparent glass table on which an original to be read by a scanner (reading unit) is placed. An original cover 302 is a part used to press an original when the scanner reads the original, and prevent external leakage of light from a light source, with which the original is irradiated at the time of reading. A printing paper insertion port 303 is an insertion port capable of setting paper sheets having a variety of sizes. Printing media such as pieces of paper set in the printing paper insertion port 303 are conveyed to a printing unit one by one. Each paper undergoes printing in the printing unit and is discharged from a printing paper discharge port 304. An operation display unit 305 is formed from, for example, keys such as character input keys, a cursor key, an enter key, a cancel key, and the like and an LED (Light Emitting Diode) or an LCD (Liquid Crystal Display). The user can start the various functions or make various settings in the MFP 300 via the operation display unit 305. The operation display unit 305 is formed by a touch panel, and may be formed by integrating the display unit and the operation unit with each other. A WLAN antenna 306 is an antenna for WLAN communication and is included inside the MFP 300.

FIGS. 4A to 4C are views each schematically showing an example of a screen display in the operation display unit 305 of the MFP 300. FIG. 4A shows the example of the arrangement of a home screen 410 which displays a state (idle state) in which the MFP 300 is powered on and an operation such as print or scan is not performed. Copy, scan, menu display or various settings of a cloud function utilizing Internet communication, or function execution can be performed by a key operation or a touch panel operation on the operation display unit 305. It is also possible, by the key operation or the touch panel operation, to display a function (FIG. 4B) different from that in FIG. 4A seamlessly from the home screen 410 of FIG. 4A. FIG. 4B is the example of a screen which displays different functions by an operation, and here shows a screen 411 which selectably displays functions capable of executing execution of a print and photo functions and the change of LAN setting. FIG. 4C shows a screen 412 displayed when the LAN setting is selected on the screen 411 of FIG. 4B. The user can set activation/deactivation of the infrastructure mode by selecting the "wireless LAN" via the screen 412. The user can also set activation/deactivation of the P2P mode (Peer-to-Peer mode) by selecting "wireless direct". Note that the functions shown in FIGS. 4A to 4C are merely an example, and the present invention is not limited to these. In addition, a screen switchable by an operation is not limited to the above-described screens, and can be displayed by further being switched to another screen.

FIG. 5 is a block diagram showing an example of the hardware arrangement of the terminal apparatus 200. The terminal apparatus 200 includes a main board 501 which performs main control of the apparatus itself and a WLAN unit 517 which performs WLAN communication.

In the main board 501, a CPU (Central Processing Unit) 502 is a system control unit and controls overall various operations of the terminal apparatus 200. The following processing by the terminal apparatus 200 is executed under the control of the CPU 502. A ROM 503 is a nonvolatile storage area, and stores control programs to be executed by the CPU 502, an embedded operating system (OS) program, and the like. In this embodiment, the respective control programs stored in the ROM 503 are executed by the CPU 502, performing software control such as scheduling and task switching under the management of the embedded OS stored in the ROM 503.

A RAM 504 is a volatile storage area and is implemented by an SRAM (Static RAM) or the like. The RAM 504 stores data such as program control variables, also stores data such as setting values registered by the user and management data of the terminal apparatus 200, and is allocated with various work buffer areas. An image memory 505 is implemented by a memory such as a DRAM (Dynamic RAM), and temporarily stores image data received via the WLAN unit 517 and those read out from a data accumulation unit 513 so as to be processed by the CPU 502. A nonvolatile memory 512 is implemented by a memory such as a flash memory, and continues to store data even after power-off. Note that a memory structure is not limited to the above-described structure. For example, the image memory 505 and the RAM 504 may share a memory, or data may be backed up in the data accumulation unit 513. In this embodiment, a DRAM is used as the image memory 505. However, another storage medium such as a hard disk or a nonvolatile memory may be used, or an external storage area may further be connected.

A data conversion unit 506 performs analysis of data of various formats, and data conversion such as color conversion and image conversion. A telephone unit 507 controls a telephone line, and implements telephone communication by processing audio data input/output via a loudspeaker unit 514. An operation unit 508 controls signals of the operation unit 203 shown in FIG. 2. A GPS (Global Positioning System) 509 externally obtains position information such as the current latitude and longitude of the terminal apparatus 200. A display unit 510 electronically controls the display contents of the display unit 202 shown in FIG. 2, allows various input operations, and can display operation states, status conditions, and the like of the terminal apparatus 200.

A camera unit 511 has a function of electronically recording and encoding an image input via a lens (not shown). An image captured by the camera unit 511 is saved in the data accumulation unit 513. The loudspeaker unit 514 implements a function of inputting or outputting a speech for the telephone function, and also an alarm notification function and the like. A power supply unit 515 is implemented by a portable battery, and controls power supply to the apparatus. A power supply state includes a battery dead state in which the battery has no remaining amount, a power-off state in which the power key 204 is not pressed, a start state in which the apparatus is normally started, a power saving state in which the apparatus is started but set in a power saving mode, and the like.

The terminal apparatus 200 can perform wireless communication with an external apparatus via the WLAN by the WLAN unit 517 serving as a communication unit. Thus, the terminal apparatus 200 performs data communication with another device such as the MFP 300 or the access point 400. The WLAN unit 517 converts data into packets, and sends the packets to the other device. Conversely, the WLAN unit 517 converts packets coming from another external device into original data, and sends the data to the CPU 502. The WLAN unit 517 is connected to the main board 501 via a bus cable 516. The WLAN unit 517 is a unit used to attain communication complying with its standard.

The respective components (503 to 515 and 517) of the main board 501 are connected to each other via a system bus 518 and are arranged to be able to communicate with each other. Note that the data conversion unit 506 or the like may be configured to implement a function by the programs executed by the CPU 502 as needed.

FIG. 6 is a block diagram showing the hardware arrangement of the MFP 300. The MFP 300 includes a main board 601 which performs main control of the apparatus itself, a WLAN unit 616 which performs WLAN communication, and a modem 619.

In the main board 601, a CPU (Central Processing Unit) 602 is a system control unit, and controls the overall various operations of the MFP 300. The following processing by the MFP 300 is executed under the control of the CPU 602. A ROM 603 is a nonvolatile storage area, and stores control programs to be executed by the CPU 602, an embedded operating system (OS) program, and the like. In this embodiment, the respective control programs stored in the ROM 603 are executed by the CPU 602, performing software control such as scheduling and task switching under the management of the embedded OS stored in the ROM 603.

A RAM 604 is a volatile storage area and is implemented by an SRAM (Static RAM) or the like. The RAM 604 stores data such as program control variables, also stores data such as setting values registered by the user and management data of the MFP 300, and is allocated with various work buffer areas. A nonvolatile memory 605 is implemented by a memory such as a flash memory, and continues to store data even after power-off. An image memory 606 is implemented by a memory such as a DRAM (Dynamic RAM), and accumulates image data received via the WLAN unit 616, those processed by an encoding/decoding processing unit 611, and the like. Note that a memory structure is not limited to the above-described structure, similarly to the memory structure of the terminal apparatus 200.

A data conversion unit 608 performs analysis of data of various formats, conversion from image data into print data, and the like. A reading control unit 607 controls a reading unit 609 (for example, a CIS image sensor (contact type image sensor)) to optically read an image on an original. Next, the reading control unit 607 outputs an image signal obtained by converting the read image into electrical image data. At this time, various kinds of image processing such as binarization processing and halftone processing may be performed for the image signal, thereby outputting the resultant data.

An operation display unit 610 corresponds to the operation display unit 305 shown in FIG. 3. The encoding/decoding processing unit 611 performs encoding/decoding processing and enlargement/reduction processing for image data (JPEG, PNG, or the like) handled by the MFP 300. A paper feed unit 613 holds paper sheets used in printing. The MFP 300 can feed the paper sheet from the paper feed unit 613 under the control of a printing control unit 614. Further, as the paper feed unit 613, a plurality of paper feed units can be prepared so as to hold a plurality of types of paper sheets in one apparatus. In this case, the printing control unit 614 controls to select a paper feed unit to be used to supply paper sheets.

The printing control unit 614 performs various kinds of image processing such as smoothing processing, printing density correction processing, and color correction for image data to be printed, and outputs the processed image data to a printing unit 612. The printing unit 612 can adopt, for example, an inkjet method of printing an image by discharging, from a printhead, ink supplied from an ink tank. The printing control unit 614 also plays a role in periodically reading out information of the printing unit 612, and updating information in the RAM 604. More specifically, the printing control unit 614 updates status information such as the remaining amount of an ink tank and a printhead state.

The MFP 300 also incorporates the WLAN unit 616, similarly to the terminal apparatus 200, and a description thereof will be omitted since their functions are the same. The WLAN unit 616 is connected to the main board 601 via a bus cable 615. Note that the terminal apparatus 200 and the MFP 300 can perform communication based on WFD (Wi-Fi Direct), and has a software access point (software AP) function. A modem 619 performs conversion between a digital signal and an analog signal, and is used to communicate with an external device by using the telephone line.

The respective components (602 to 614, 616 and 617, and 619) of the main board 601 are connected to each other via a system bus 618 managed by the CPU 602, and are arranged to be able to communicate with each other. Note that the data conversion unit 608, the encoding/decoding processing unit 611, or the like may be configured to implement a function by the programs executed by the CPU 602 as needed.

[P2P (Peer-to-Peer) Method]

The MFP 300 in this embodiment is compatible with two modes below of Wi-Fi Direct® as a P2P connection method.

Autonomous GO mode: The MFP 300 autonomously plays a role as a group owner and behaves as an access point.

GO Negotiation mode: Respective roles (the group owner and a client) are decided by a Group Owner Negotiation sequence. Note that in a device having a communication function by WFD, an application specializing in implementing its communication function is called from its operation unit. Then, a negotiation for performing WFD communication is executed based on an operation for a UI (user interface) serving as an operation screen provided by the application.

Wireless communication sequences in the respective modes will be described below with reference to FIGS. 7 and 8.

FIG. 7 is a sequence chart showing the wireless connection sequence in the Autonomous GO mode. Here, the MFP 300 serves as a software AP which implements the function of the access point in the wireless LAN by software. On the other hand, the terminal apparatus 200 serves as a client which plays a role in requesting various services. That is, the MFP 300 operates as an apparatus which autonomously plays the role as the group owner. If determining that the Autonomous GO mode is activated, the MFP 300 starts its software AP.

The client searches for the access point by a device search command and detects the access point by receiving, from the access point, a device search response to the device search command (701). Then, wireless connection (such as authentication or association) is established between the client and the access point (702). Subsequently, the client and the access point perform IP connection processing (such as assignment of an IP address) (703).

Note that commands and parameters defined by the Wi-Fi® standard can be used as those sent/received to implement wireless connection between the client and the access point, and they are not particularly limited. Thus, a description thereof will be omitted here.

FIG. 8 is a sequence chart showing the wireless connection sequence in the GO Negotiation mode. Here, the terminal apparatus 200 and the MFP 300 perform communication, and the roles of the respective devices are not decided at beginning. First, between the devices that perform communication, one device (for example, the terminal apparatus 200) issues a device search command and searches for the device connected in the WFD mode (801). When the other device (for example, the MFP 300) to be a communication target is detected by a device search response to the device search command, both devices confirm information regarding services and functions that can be supplied to each other (802). Note that this device supply information confirmation is not essential but optional. This device supply information confirmation phase corresponds to, for example, P2P Provision Discovery.

Then, the respective devices mutually confirm device supply information, deciding which one of them serves as a P2P client or a P2P group owner as its role (803) (executing a negotiation process). In an example of FIG. 8, it is decided that the MFP 300 serves as the group owner, and the terminal apparatus 200 serves as the client.

After the client and the group owner are decided as the roles of the respective devices, parameters for performing communication by WFD are exchanged between both devices (804). A parameter exchange phase corresponds to, for example, automatically exchanging parameters for wireless LAN security using Wi-Fi Protected Setup. The client and group owner of P2P perform the remaining wireless connection processing (805) and IP connection processing (806) based on the exchanged parameters. Note that an apparatus operating as the group owner in the Wi-Fi Direct mode operates like the AP, and the client operates like a station (STA) connected to the AP. In general, the apparatus operating as the group owner sends the device search response command in response to a device search request command sent from the apparatus operating as the client.

Further, the apparatus operating as the group owner compares client channel information obtained by Group Owner Negotiation with its usable channels, deciding a channel to be used in the Wi-Fi Direct mode.

First Embodiment

The first embodiment of the present invention will be described with reference to FIGS. 9 to 12.

Figure 12:
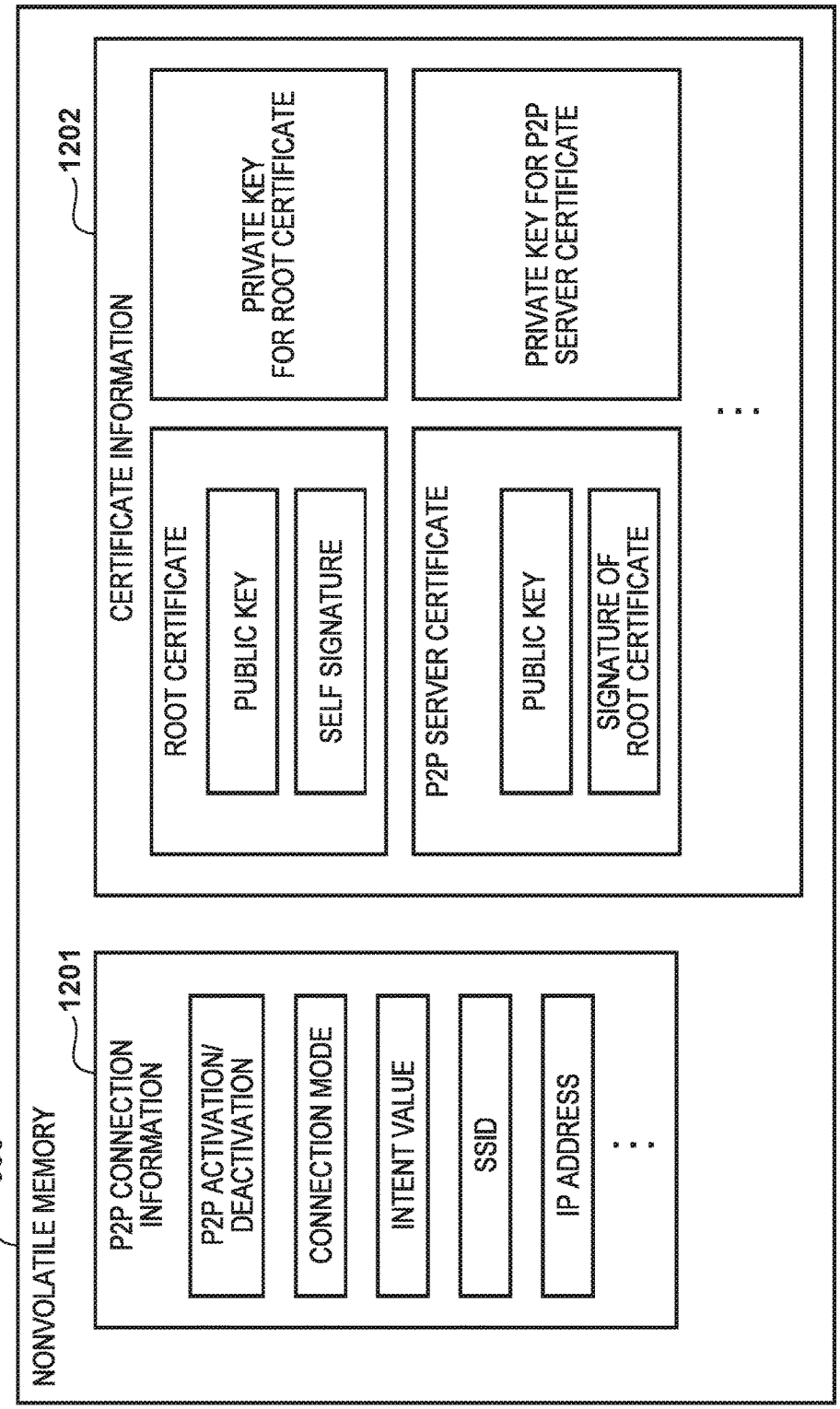
FIG. 12 is a block diagram showing an example of the arrangement of information saved in the MFP according to the first embodiment.

In this embodiment, a MFP 300 serving as a communication apparatus holds, in a nonvolatile memory 605, P2P connection information 1201 and certificate information 1202 shown in FIG. 12. The P2P connection information 1201 contains information used to connect to a communication target apparatus in a P2P connection method according to this embodiment. For example, setting of activation/deactivation of P2P connection, designation of a connection mode, an intent value, an SSID (Service Set Identifier), an IP address, and the like are included as the P2P connection information 1201. This information may be set by a user of the communication apparatus or may be set upon shipment of a product. The P2P connection information 1201 is not limited to the above-described setting items but may contain another information.

The certificate information 1202 contains information regarding a certificate used in SSL communication. For example, a root certificate, a private key for the root certificate, a server certificate, a private key for the server certificate, and the like are included as the certificate information 1202. Each certificate contains information regarding a public key and a signature. Note that a known arrangement can be applied to the arrangement of each certificate, and the present invention is not limited to the above-described arrangement.

Figure 9:
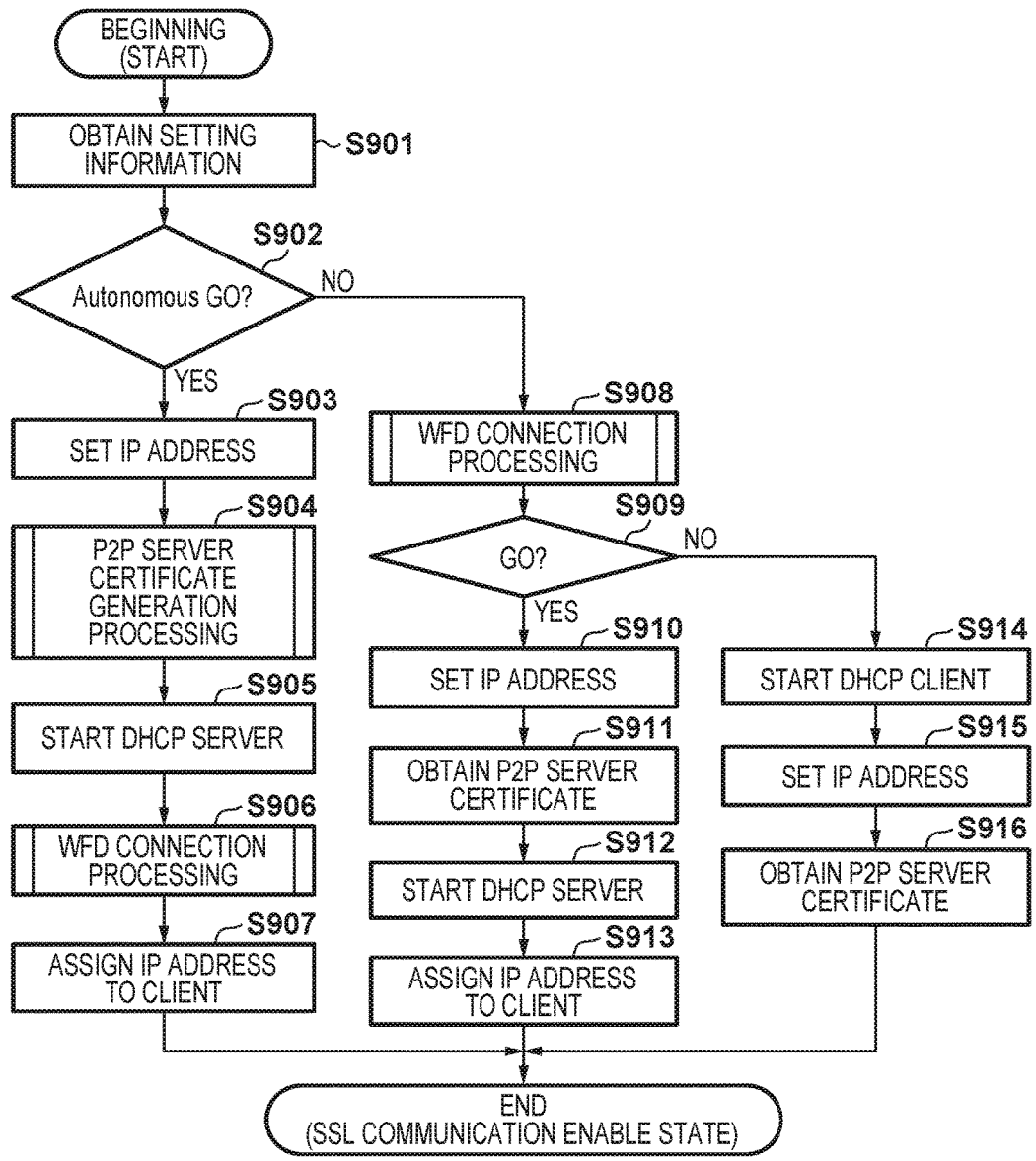
FIG. 9 is a flowchart from the start of an MFP to enabled SSL communication according to the first embodiment.

FIG. 9 is a flowchart from the start of the MFP 300 to enabled SSL (Secure Sockets Layer) communication that is secure communication according to this embodiment. This processing sequence is started by starting the MFP 300. Further, this processing sequence is implemented by, for example, causing a CPU 602 of the MFP 300 to read out and execute programs or the like stored in a ROM 603 or the like.

In step S901, the MFP 300 obtains, out of setting information stored in the nonvolatile memory 605, the P2P connection information 1201 (the connection mode, the IP address, and the like) shown in FIG. 12. Note that in this embodiment, P2P connection is set as "active". Further, either an Autonomous GO mode or a GO negotiation mode is set as the connection mode. If the MFP 300 operates as the Autonomous GO mode, the MFP 300 operates as a role in deciding a communication channel used for direct wireless connection. On the other hand, if operating as the GO Negotiation mode, the MFP 300 executes another processing. That is, the MFP 300 executes role decision processing of deciding whether to operate as the role in deciding the communication channel used for the direct wireless connection with the communication target apparatus. Note that the role decision processing is processing in which the MFP 300 and the communication target apparatus exchange Intent values, and decide which one of them operates as the role in deciding the communication channel used for the direct wireless connection.

In step S902, the MFP 300 determines whether the connection mode is the Autonomous GO mode based on the information obtained in step S901. If the connection mode is the Autonomous GO mode (YES in step S902), the process advances to step S903; otherwise (NO in step S902), the process advances to step S908.

In step S903, the MFP 300 sets the IP address obtained in step S901 for a P2P network interface (for example, a WLAN unit 616).

In step S904, the MFP 300 generates a server certificate used in P2P SSL communication. Step S904 will be described in detail later with reference to FIG. 10.

In step S905, the MFP 300 starts a DHCP (Dynamic Host Configuration Protocol) server (not shown) in order to assign an IP address to a client and enters a WFD connection standby state. Note that the MFP 300 has the function of the DHCP server inside thereof, and the function can be implemented by, for example, causing the CPU 602 to execute the programs stored in the ROM 603 or the like.

In step S906, the MFP 300 executes WFD connection processing with the client. The WFD connection processing is the sequence in the Autonomous GO mode described in FIG. 7.

After the completion of the WFD connection processing, in step S907, the MFP 300 assigns the IP address to the client by a DHCP. A known technique is used to assign the IP address to the client by the DHCP, and a detailed description thereof will be omitted here. Consequently, a SSL communication enable state is set, terminating this processing sequence.

Subsequently, processing if the MFP 300 determines NO in step S902 will be described. In step S908, the MFP 300 enters the WFD connection standby state and executes WFD connection processing with the communication target apparatus. The WFD connection processing in step S908 is the wireless connection sequence in the GO Negotiation mode described in FIG. 8.

After the completion of the WFD connection processing, in step S909, the MFP 300 determines whether its role is a group owner or a client. That is, the processing in step S908 decides whether the role of the MFP 300 is the group owner or the client. If its role is the group owner (YES in step S909), the process advances to step S910. If its role is the client (NO in step S909), the process advances to step S914.

In step S910, the MFP 300 sets the IP address obtained in step S901 for the P2P network interface (for example, the WLAN unit 616).

In step S911, the MFP 300 obtains the server certificate used in the P2P SSL communication stored in the nonvolatile memory 605. That is, at this point in time, a new server certificate is not created but the existing server certificate is obtained.

In step S912, the MFP 300 starts the DHCP server (not shown).

In step S913, the MFP 300 assigns the IP address to the client by the DHCP. The known technique is used to assign the IP address to the client by the DHCP, and the detailed description thereof will be omitted here. Consequently, the SSL communication enable state is set, terminating this processing sequence.

In step S914, the MFP 300 starts a DHCP client (not shown) in order to obtain the IP address. The MFP 300 has the function of the DHCP client inside thereof, and the function can be implemented by, for example, causing the CPU 602 to execute the programs stored in the ROM 603 or the like.

In step S915, the MFP 300 obtains the IP address by the DHCP client.

In step S916, the MFP 300 obtains the server certificate used in the P2P SSL communication stored in the nonvolatile memory 605. That is, at this point in time, a new server certificate is not created but the existing server certificate is obtained. Consequently, the SSL communication enable state is set, terminating this processing sequence.

In this embodiment, the MFP 300 generates the server certificate in the Autonomous GO mode (step S904) and uses that server certificate. On the other hand, the MFP 300 does not generate the server certificate in the GO Negotiation mode and uses the existing server certificate held before executing the role decision processing (steps S911 and S916). This establishes wireless connection with the client after the IP address is determined in the Autonomous GO mode. This is because it is therefore possible to wait for connection from the client after generating a server certificate in which the fixed IP address is embedded. In other words, in the Autonomous GO mode, it is possible to generate the server certificate in advance (steps S903 and S904) and wait for a connection request from the client. On the other hand, in the GO Negotiation mode, wireless connection has already (at a point in time of step S908) been established at a point in time when the IP address is determined. Accordingly, if the server certificate is generated after the IP address is determined, that makes a communication target user with established wireless connection wait until the SSL communication is enabled. Therefore, in the GO Negotiation mode, the server certificate is not generated after connection with the client is established, but the existing server certificate is only obtained. With the above-described processing, generation of the server certificate is controlled in accordance with each mode. That is, in this embodiment, a user of a terminal apparatus 200 can reduce a time between finding the MFP 300 as a target of Wi-Fi Direct® and becoming able to send print data.

Figure 10:
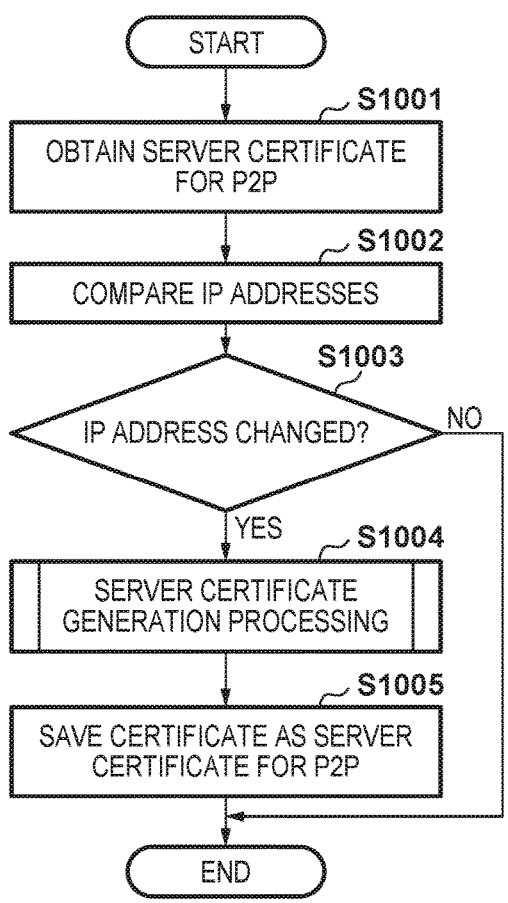
FIG. 10 is a flowchart showing server certificate generation processing according to the first embodiment.

FIG. 10 is a flowchart showing server certificate generation processing in step S904 of FIG. 9.

In step S1001, the MFP 300 obtains, out of the certificate information 1202 stored in the nonvolatile memory 605 shown in FIG. 12, the server certificate used in the P2P SSL communication. Various certificates contain subject information (information regarding an owner) which includes a common name field (not shown). In this embodiment, an IP address is set to the common name of the server certificate.

In step S1002, the MFP 300 extracts common name information from the server certificate obtained in step S1001 and compares the IP address of the common name with the IP address obtained in step S901 (the IP address designated in the P2P connection information 1201).

In step S1003, the MFP 300 determines, as a result of the comparison, whether the IP address is changed. If the IP address is changed, (YES in step S1003), the process advances to step S1004. If the IP address is not changed (NO in step S1003), a new server certificate need not be generated, terminating this processing sequence.

In step S1004, the MFP 300 generates a server certificate by using changed IP address information (the IP address designated in the P2P connection information 1201). Step S1004 will be described in detail later with reference to FIG. 11.

In step S1005, the MFP 300 saves, in the nonvolatile memory 605, the generated certificate as a server certificate for P2P. This processing sequence thus ends.

Figure 11:
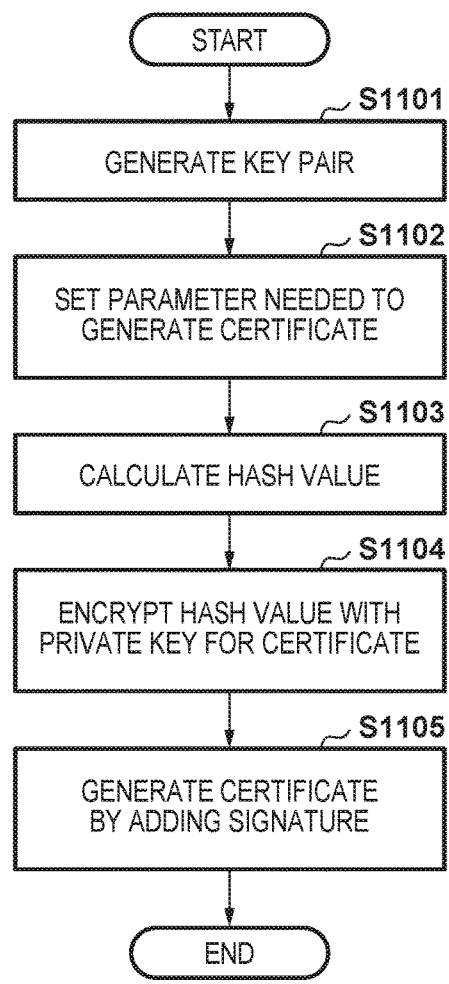
FIG. 11 is a flowchart showing the certificate generation processing according to the first embodiment.

FIG. 11 is a flowchart showing the certificate generation processing in step S1004 of FIG. 10.

In step S1101, the MFP 300 generates a pair (key pair) of a public key and a private key as key information used to execute encryption processing by using the public key. A public key cryptosystem includes, for example, RSA encryption or an elliptic curve cryptography (ECC). A key generation method uses a known method, and a detailed description thereof will be omitted here.

In step S1102, the MFP 300 sets necessary parameters so that the public key generated in step S1101 can be used as a certificate. The necessary parameters here correspond to, for example, a country name, a prefecture name, a city name, an organization name, a department name, a common name, an expiration date, an encryption method, and the like.

In step S1103, the MFP 300 calculates a hash value by using a hash algorithm such as SHA-256 for the public key generated in step S1101 and the parameters set in step S1102. Note that the hash algorithm used here is merely an example, and the present invention is not limited to this.

In step S1104, the MFP 300 encrypts the hash value calculated in step S1103 with the private key for the certificate, affixing a signature. The MFP 300 can selectively use a certificate used for the signature in step S1104 depending on a certificate to be generated. If a root certificate is to be generated, the MFP 300 affixes a signature with the private key to be the pair for the public key generated in step S1101. This makes it possible to generate a so-called self-signed certificate with an issuer and a subject being the same. The MFP 300 generates this self-signed certificate at the time of initial start and saves, in the nonvolatile memory 605, it as the root certificate together with the private key. When generating the server certificate used in the SSL communication, the MFP 300 affixes the signature with the private key for the root certificate by using the root certificate which is generated in advance for the public key generated in step S1101 as a higher certificate authority.

In step S1105, the MFP 300 adds signature information to the public key, generating the certificate. This processing sequence thus ends.

As described above, with this embodiment, it is possible, by determining the mode when the wireless connection is performed and controlling generation of the server certificate in accordance with the mode determination result, to reduce a time between requesting the connection from the client and enabling the SSL communication.

Second Embodiment

The second embodiment of the present invention will be described with reference to FIGS. 13 and 14. In the first embodiment, the presence/absence of the certificate generation processing is controlled in accordance with the mode when the wireless connection is performed. In the second embodiment, encryption methods each influencing a processing load in certificate generation processing are switched in accordance with modes.

Figure 14:
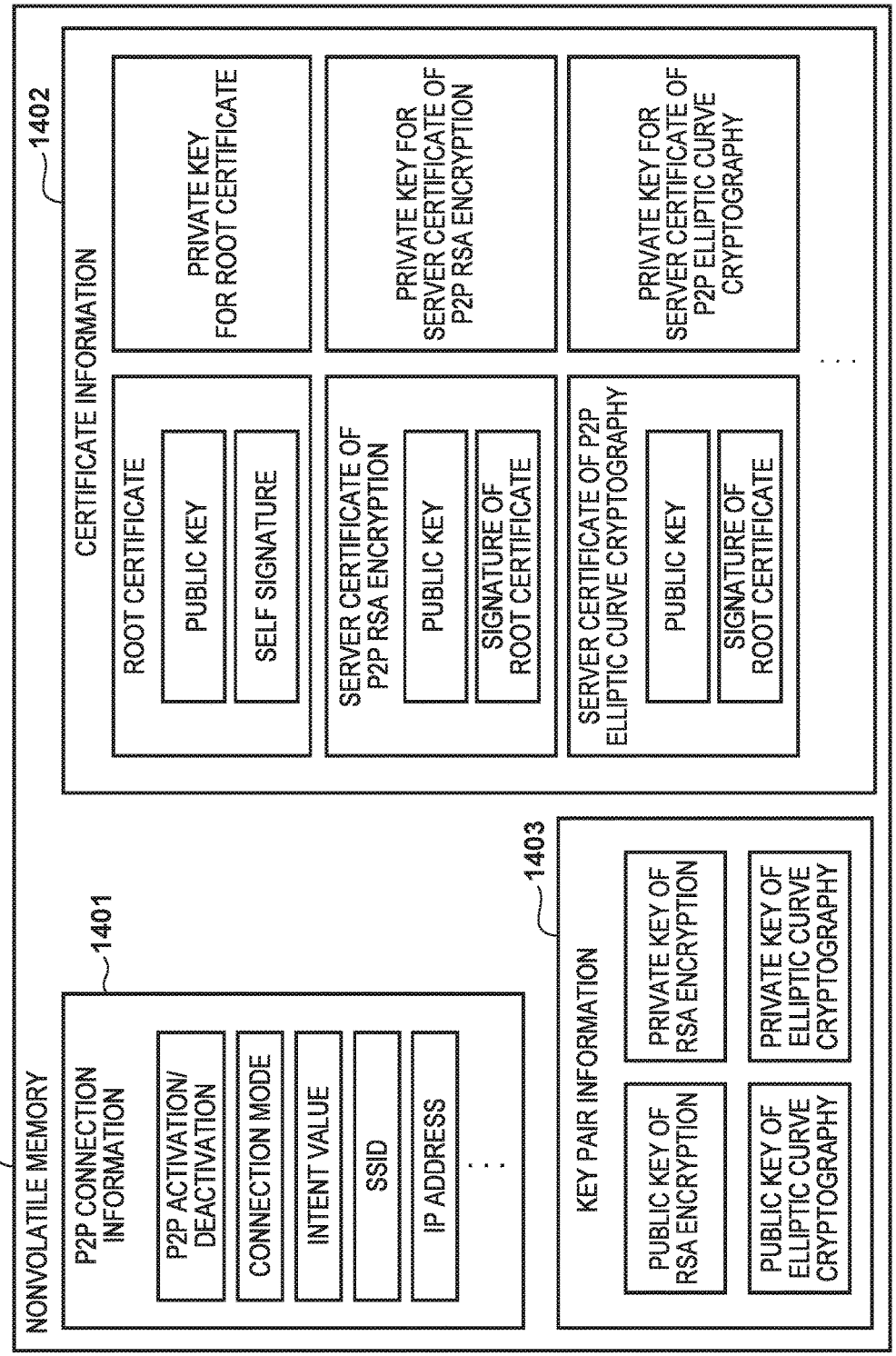
FIG. 14 is a block diagram showing an example of the arrangement of information saved in the MFP according to the second embodiment.

In this embodiment, a MFP 300 serving as a communication apparatus holds, in a nonvolatile memory 605, P2P connection information 1401, certificate information 1402, and key pair information 1403 shown in FIG. 14. The P2P connection information 1401 is the same as the P2P connection information 1201 described in the first embodiment with reference to FIG. 12.

In addition to a root certificate and a private key for the root certificate, the certificate information 1402 includes server certificates and private keys for the server certificates corresponding to respective encryption methods. The key pair information 1403 includes key pairs (public keys and private keys) corresponding to the respective encryption methods. The key pair information 1403 will be described in detail later together with a flowchart. Note that in this embodiment, a description will be given by taking, as an example, RSA encryption and an elliptic curve cryptography as the encryption methods handled by the MFP 300.

Figure 13:
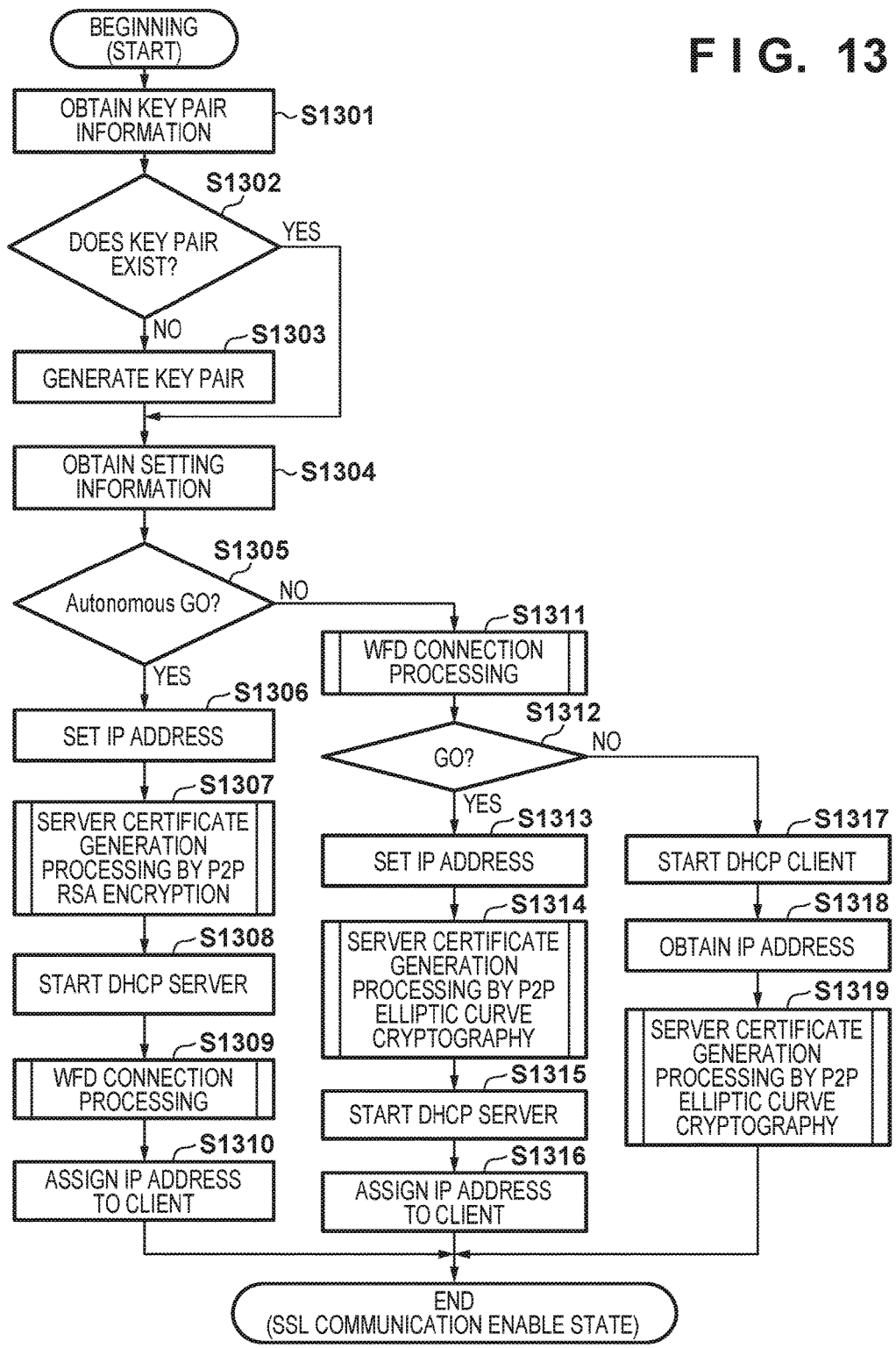
FIG. 13 is a flowchart from the start of an MFP to enabled SSL communication according to the second embodiment.

FIG. 13 is a flowchart from the start of the MFP 300 to enabled SSL communication according to this embodiment. This processing sequence is started by starting the MFP 300. Further, this processing sequence is implemented by, for example, causing a CPU 602 of the MFP 300 to read out and execute programs or the like stored in a ROM 603 or the like.

In step S1301, the MFP 300 obtains, out of setting information stored in the nonvolatile memory 605, the key pair information 1403 shown in FIG. 14.

In step S1302, the MFP 300 confirms whether the key pairs exist for both the RSA encryption and the elliptic curve cryptography based on the information obtained in step S1301. If the key pair information exists (YES in step S1302), the process advances to step S1304. If the key pair information does not exist (NO in step S1302), the process advances to step S1303.

In step S1303, the MFP 300 generates the key pairs. A known method is used for a method of generating the key pair corresponding to each encryption method, and a detailed description thereof will be omitted here. The nonvolatile memory 605 holds the generated key pairs. Subsequently, the process advances to step S1304.

Steps S1304 to S1306 are basically the same as steps S901 and S903, and are different in that the obtained information is changed from FIG. 12 to FIG. 14. Thus, a detailed description thereof will be omitted.

In step S1307, the MFP 300 generates an RSA encryption server certificate used in P2P SSL communication. The basic sequence of this step is the same as that of FIGS. 10 and 11 described in the first embodiment and further, a method based on a known technique is applicable to a method of generating the server certificates by RSA encryption. Thus, a detailed description thereof will be omitted here.

Steps S1308 to S1310 are basically the same as steps S905 to S907 in processing, and thus a detailed description thereof will be omitted.

Subsequently, processing if it is determined NO in step S1305 will be described. Note that steps S1311 to S1313 are basically the same as steps S908 to S910 in processing, and thus a detailed description thereof will be omitted.

In step S1314, the MFP 300 generates the server certificate of the elliptic curve cryptography used in the P2P SSL communication. Similarly to step S1307, the basic sequence of this step is the same as that of FIGS. 10 and 11 described in the first embodiment and further, a method based on the related art is applicable to a method of generating the server certificate by the elliptic curve cryptography. Thus, a detailed description thereof will be omitted here.

Steps S1315 and S1316 are basically the same as steps S912 and S913 in processing, and thus a detailed description thereof will be omitted.

Steps S1317 and S1318 are basically the same as steps S914 and S915 in processing, and thus a detailed description thereof will be omitted.

In step S1319, the MFP 300 generates the server certificate of the elliptic curve cryptography used in the P2P SSL communication by using the IP address obtained in step S1318. Similarly to step S1307, the basic sequence of this step is the same as that of FIGS. 10 and 11 described in the first embodiment and further, the method based on the related art is applicable to the method of generating the server certificate by the elliptic curve cryptography. Thus, a detailed description thereof will be omitted here. Consequently, a SSL communication enable state is set, terminating this processing sequence.

Note that once the SSL communication enable state is set, a key pair may be generated in another task and saved in the nonvolatile memory 605 for next certificate generation, although not shown.

In this embodiment, the RSA encryption certificate is used when a P2P connection mode is an Autonomous GO mode, and the certificate of the elliptic curve cryptography is used when the mode is a GO Negotiation mode. This is for making it possible to connect to a group owner waiting for connection in the Autonomous GO mode even from a WFD-incompatible terminal by the same method as a method of connecting to a normal access point. That is, considering that the group owner is connected not only from a WFD-compatible terminal but also from various terminals, it is desirable to use the RSA encryption widely used at present. Note that from the above-described viewpoint, the present invention is not limited to the RSA encryption but may be another encryption method as long as it is a widespread (supported by a communication target apparatus) encryption method.

On the other hand, if connected in the GO Negotiation mode, a connection target is a terminal having a compatible function and is likely to be also compatible with the elliptic curve cryptography relatively newer than the RSA encryption. As compared with the RSA encryption, the elliptic curve cryptography can implement a similar encryption strength with a shorter key length, reducing a load of calculation processing (that is, a load of certificate generation processing). Therefore, if it is determined NO in step S1306, it is desirable to use the elliptic curve cryptography capable of reducing a time required for certificate generation. Note that from the above-described viewpoint, another encryption method may be used in consideration of a compatible status of a terminal to be the communication target apparatus with the encryption method.

As described above, the server certificate generation processing in steps S1307, S1314, and S1319 in this embodiment is the same as that described in the first embodiment with reference to FIGS. 10 and 11. However, an encryption method is selectively used depending on the connection mode (the Autonomous GO mode or the GO Negotiation mode), and it is therefore necessary to hold a parameter for determining the type of encryption method of the certificate being generated. In this embodiment, the key pairs are generated in advance, replacing key pair generation in step S1101 of FIG. 11 with obtaining the key pairs from the nonvolatile memory 605.

As described above, with this embodiment, it is possible, by switching the encryption methods different in processing load in accordance with the connection modes, to reduce the processing load. As a result, a time between requesting a connection from a client and enabling SSL communication can be reduced. Further, the encryption method can be set in consideration of the compatible status with the encryption method in the communication target apparatus, building a flexible system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-102852, filed May 23, 2016, which is hereby incorporated by reference herein in its entirety.

What is claimed is:

1. A communication apparatus capable of secure wireless communication with a communication target apparatus by using a certificate, the apparatus comprising:
    a determining unit configured to determine, in the communication apparatus, one of whether a first mode which operates as a role in deciding a communication channel used for direct wireless connection with the communication target apparatus is activated and whether a second mode which executes role decision processing of deciding whether to operate as the role in deciding the communication channel used for the direct wireless connection with the communication target apparatus is activated; and
    a control unit configured to utilize a certificate generated by using a first encryption method if the determining unit determines that the first mode is activated and utilize a certificate generated by using a second encryption method lower in a load of certificate generation processing than the first encryption method if the determining unit determines that the second mode is activated,
    wherein the first encryption method is RSA encryption, and the second encryption method is an elliptic curve cryptography.

2. The apparatus according to claim 1, wherein the communication apparatus is capable of communication by Wi-Fi Direct,
    the first mode is an Autonomous GO mode, and
    the second mode is a GO Negotiation mode.

3. The apparatus according to claim 1, further comprising
    a unit configured to generate key information corresponding to an encryption method, and
    a unit configured to hold the key information.

4. The apparatus according to claim 3, wherein the key information is made of a pair of a public key and a private key.

5. The apparatus according to claim 1, wherein the communication apparatus is a printer.

6. A communication method in a communication apparatus capable of secure wireless communication with a communication target apparatus by using a certificate, the method comprising:
    in the communication apparatus, determining one of whether a first mode which operates as a role in deciding a communication channel used for direct wireless connection with the communication target apparatus is activated and whether a second mode which executes role decision processing of deciding whether to operate as the role in deciding the communication channel used for the direct wireless connection with the communication target apparatus is activated; and
    controlling to utilize a certificate generated by using a first encryption method if determining that the first mode is activated in the determining and utilize a certificate generated by using a second encryption method lower in a load of certificate generation processing than the first encryption method if determining that the second mode is activated,
    wherein the first encryption method is RSA encryption, and the second encryption method is an elliptic curve cryptography.

7. The method according to claim 6, wherein the communication apparatus is capable of communication by Wi-Fi Direct,
    the first mode is an Autonomous GO mode, and
    the second mode is a GO Negotiation mode.

8. The method according to claim 6, further comprising
    generating key information corresponding to an encryption method, and
    holding the key information in a holding unit.

9. The method according to claim 6, further comprising holding, in holding unit, setting information of connection in the wireless communication,
    wherein in the determining, a determination is made based on the setting information held in the holding unit.

10. The method according to claim 6, wherein the communication apparatus is a printer.

* * * * *